United States Patent
Neylon et al.

(10) Patent No.: US 7,572,429 B1
(45) Date of Patent: Aug. 11, 2009

(54) CYCLIC PRE-REFORMER/DESULPHURIZATION UNIT

(75) Inventors: Michael K. Neylon, Tacoma, WA (US); David C. LaMont, Bartlesville, OK (US); Karen M. Fleckner, Tacoma, WA (US)

(73) Assignee: Nu Element, Inc., Tacoma, WA (US)

( * ) Notice: Subject to any disclaimer, the term of this patent is extended or adjusted under 35 U.S.C. 154(b) by 212 days.

(21) Appl. No.: 11/676,229

(22) Filed: Feb. 16, 2007

Related U.S. Application Data

(60) Provisional application No. 60/774,479, filed on Feb. 17, 2006.

(51) Int. Cl.
*C01B 3/22* (2006.01)
*C01B 17/50* (2006.01)
*C07C 4/00* (2006.01)

(52) U.S. Cl. .................. 423/539; 423/220; 423/230; 423/650; 423/651; 423/652; 252/373

(58) Field of Classification Search ............ 423/539, 423/220, 230, 650, 651, 652; 252/373
See application file for complete search history.

(56) References Cited

U.S. PATENT DOCUMENTS

| | | | |
|---|---|---|---|
| 7,354,560 B2 * | 4/2008 | Nielsen et al. ........... | 423/242.1 |
| 2005/0106428 A1 * | 5/2005 | Bolden ................. | 429/19 |
| 2007/0178034 A1 * | 8/2007 | Hojlund Nielsen et al. .................. | 423/242.1 |
| 2008/0011646 A1 * | 1/2008 | Giroux et al. ............. | 208/133 |
| 2008/0041766 A1 * | 2/2008 | Giroux et al. ............. | 208/136 |

* cited by examiner

*Primary Examiner*—Timothy C Vanoy
(74) *Attorney, Agent, or Firm*—Darby & Darby PC

(57) ABSTRACT

A combined desulphurization and pre-reforming processing unit converts logistic fuels such as JP-5, JP-8, gasoline, and diesel with high sulfur content levels, into a mixture of hydrogen, methane, carbon monoxide, carbon dioxide, and water without any sulfur or higher hydrocarbons. The fuel is processed at lower temperatures with sulfur-resistant materials in order to break down all the heavy hydrocarbons into methane and carbon oxides while capturing the sulfur simultaneously. The resulting feed is passed to a methane reforming system to generate additional hydrogen with no effects of coking or sulfur poisoning on the reforming system. The unit itself operates in a cyclic manner in order to regenerate the bed.

34 Claims, 1 Drawing Sheet

CYCLIC PRE-REFORMER/DESULPHURIZATION UNIT

CROSS-REFERENCE TO RELATED APPLICATIONS

Figure 1:
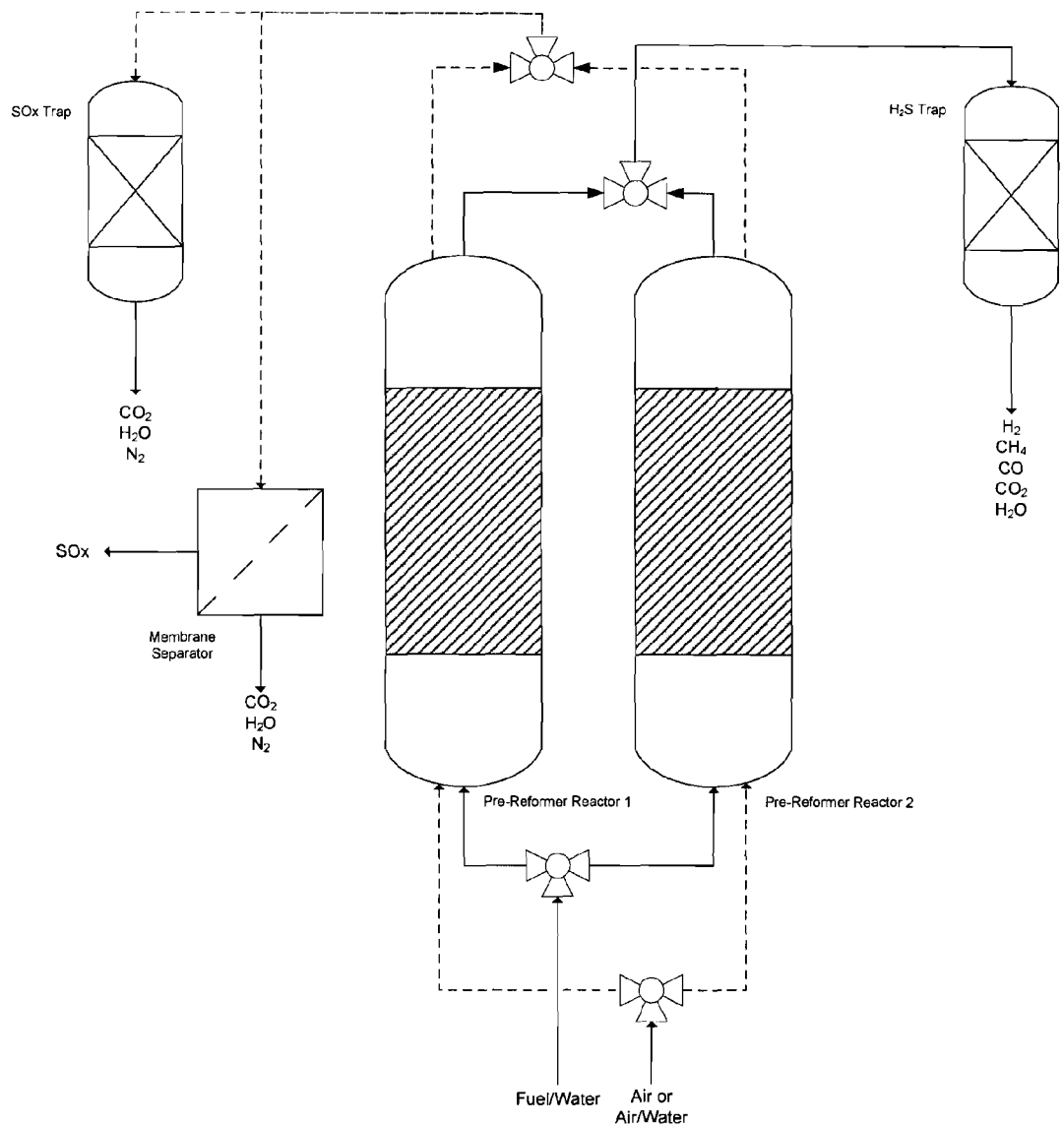

This application claims the benefit under 35 USC 119(e) of U.S. Provisional Patent Application Ser. No. 60/774,479, filed on Feb. 17, 2006, which is herein incorporated by reference.

FIELD OF THE INVENTION

The present invention pertains to a process of pre-reforming of liquid hydrocarbons sulfur-laden fuels to produce a light hydrocarbon, sulfur-free stream that is well suited for reforming that mitigates coke and sulfur poisoning in these processes.

BACKGROUND OF THE INVENTION

In order to support the widespread use of fuel cells in many areas of transportation and military use, it is necessary to develop methods of processing liquid fuels to generate hydrogen for use by fuel cells. There have been many successful efforts in the development of fuel processors that can work off sulfur-free methane with demonstrated long lifetimes. However, the fuels with the highest energy density, such as diesel, gasoline, and jet fuels, consist of a large amount of heavy hydrocarbons, including aromatics, as well as upwards of 0.5 wt % sulfur. Catalysts for high temperature reforming of these fuels are very susceptible to coke formation from these higher hydrocarbon species, as well as from sulfur poisoning, and thus it is very difficult to develop a fuel processor that can operate on this fuel directly.

It is possible to convert the heavy hydrocarbons to lighter ones through the process of pre-reforming, whereby the fuel is contacted with steam over a catalyst at temperatures about 100 to 300° C. lower than typical reforming temperatures in order to produce an equilibrium mix of methane, hydrogen, carbon oxides, and water. This lower temperature for pre-reformer can reduce, but not completely remove, the formation of coke during the pre-reforming process. The output stream from pre-reforming can then be reformed at high temperatures without concerns for coke mitigation with only methane present over well known catalysts. However, pre-reforming does not remove any sulfur in the input fuel; this sulfur can affect both the pre-reformer and reformer catalysts, as well as other processing units within the fuel processor or fuel cell.

Sulfur is generally removed from fuel in one of two means. The simplest process is the use of a sulfur-adsorbent bed, usually based on zinc-oxide. This bed will capture not only $H_2S$ but also sulfur-containing hydrocarbons, but will have a limited capacity for sulfur uptake. The other typical option used for sulfur removal is hydrodesulphurization, where the fuel is contacted with hydrogen and steam at pressures between 5-20 atm and 350-500° C.; this will strip sulfur from large molecules while leaving these mostly intact, generating a sulfur-free fuel and $H_2S$. The latter species will still need to be removed by an adsorption bed prior to fuel reforming. Neither of these options are ideal for a fuel processor; the zinc oxide bed would require frequent maintenance, and an hydrodesulphurization system would be both energy intensive and very difficult to design for a small processor.

There is a need for a solution to convert heavy hydrocarbon, sulfur-laden fuels into hydrogen for a system with sufficient longevity without frequent maintenance cycles. A system that combines the benefits of pre-reforming

SUMMARY OF THE INVENTION

The present invention is a cyclic swing-operation of two or more pre-reformer reactors; while a fraction of the reactors are performing pre-reforming and to capture sulfur from the fuel, the remaining reactors will be regenerated to remove coke and sulfur from the pre-reformer reactors. Both sides of the swing operation include a trap or separations system to prevent sulfur from either being vented or entering the fuel processor.

BRIEF DESCRIPTIONS OF THE DRAWINGS

FIG. 1 is a schematic diagram of one embodiment of a flow process for the pre-reforming swing operation as per the present invention.

DETAILED DESCRIPTION OF THE INVENTION

The purpose of this invention is to use a combined desulphurization and pre-reforming processing unit to convert logistic fuels such as JP-5, JP-8, gasoline, and diesel with high sulfur content levels, into a mixture of hydrogen, methane, carbon monoxide, carbon dioxide, and water without any sulfur or higher hydrocarbons. Normally, when these sulfur-laden fuels are reformed at high temperatures, a reforming system will suffer from both sulfur-poisoning from the feed fuel as well as coking due to the conversion of heavy hydrocarbons. In this invention, the fuel is processed at lower temperatures with sulfur-resistant materials in order to break down all off the heavy hydrocarbons into methane and carbon oxides while capturing the sulfur simultaneously. The result feed would be passed to a methane reforming system to generate additional hydrogen with no effects of coking or sulfur poisoning on the reforming system. The unit itself would operate in a cyclic manner in order to regenerate the bed.

The schematic in FIG. 1 demonstrates the process flow of the invention. The main embodiment of the processing unit are two or more reactors arranged in a cyclic formation. During normal operation, one or more of the reactors would be performing pre-reforming of the fuel with steam; in this process, fuel and steam would be contacted with catalyst (M) to perform the breakdown of the fuel into smaller components as shown below:

$$C_mH_nS_x+H_2O+M \rightarrow MS+C+CH_4+CO+CO_2+H_2S$$

The output from these reactors during this process is then sent to a $H_2S$ trap consisting of a zinc oxide-based adsorbent. This trap would require replacement or maintenance to retain the required sulfur adsorption. The remainder of the reactor output stream will then be primary methane, hydrogen, carbon oxides, and water which can then be sent to a reformer for additional processing.

The remainder of the reactors will be run in a regeneration mode, where either air or a mixture of air and water is used to pull off the sulfur and any coke off the reactor, as shown below:

$$MS+C+O_2 \rightarrow M+SO_2+CO_2+H_2O$$

The output from these reactors can be processed in one or two ways. One possibility is to pass the produce gases through a $SO_x$ trap based on calcium carbonate, which, as with the $H_2S$ trap, would require a maintenance cycle for replacement. Another option would be to use a size-selective membrane to separate the $SO_x$ species from the output stream and trapped, while allowing $CO_2$ and $H_2O$ to be passed out to the exhaust.

In the present embodiment, M may be a combination of one or more metal oxides, one or more metal oxides, or a combination of these materials. The catalyst M would ideally adsorb a significant quantity of the sulfur in the fuel, though uncaptured sulfur will be trapped after the reactors. The key factors that this catalyst must possess would include the reversible removal of sulfur, either driven by oxidation or through thermodynamic reversibility, and thermal stability during the regeneration cycle. Ideally, this catalyst should also be very active to the pre-reforming of liquid fuels to reduce the reactor sizes.

What is claimed is:

1. A staged process comprising contacting, in a first stage, water and liquid fuel containing sulfur over a catalyst material to convert the fuel into methane, hydrogen, carbon monoxide, carbon dioxide, and hydrogen sulfide, and upon which the hydrogen sulfide is captured by the catalyst material; and contacting, in a second stage, the catalyst material with a mixture of air and water to remove the hydrogen sulfide from the catalyst material as sulfur dioxide and water.

2. The process of claim 1, where the catalyst material is a mixture of two or more catalyst phases.

3. The process of claim 2, where the catalyst material is a multifunctional catalyst which contains all phases.

4. The process of claim 2, where at least one phase of the catalyst material contains a phase active for hydrocarbon reformation, and at least one additional phase of the catalyst material contains a material for sulfur capture.

5. The process of claim 4, where the reformation catalyst phase consists of at least one metallic component.

6. The process of claim 5, where the metallic component is Ni, Cu, Co, Fe, Pt, Pd, Rh, Ru or Ir.

7. The process of claim 4, where the sulfur capture component consists of at least a metal oxide component.

8. The process of claim 7, where the metal of the metal oxide component is a member of the rare earth components.

9. The process of claim 7, where the metal of the metal oxide component is Zn, Mg, Mn, Mo, Co, Ni, W, Fe, Ce, Zr, or La.

10. The process of claim 1, where two or more reactors filled with the catalyst material are used, and are cycled through with the use of two or more valves such that at any time, at least one reactor is always performing the first stage of reformation, and at least one reactor is always performing the second stage of sulfur removal.

11. The process of claim 1, where a sulfur trap is used on an output of the first stage.

12. The process of claim 11, where the sulfur trap consists of a sulfur absorbent solid material or a metal-organic framework absorbent.

13. The process of claim 1, where a sulfur trap is used on an output of the second stage.

14. The process of claim 13, where the sulfur trap consists of a sulfur absorbent solid material or a metal-organic framework absorbent.

15. The process of claim 10, where a sulfur detection sensor is used on an output of the first stage to trigger stage switching of the process.

16. The process of claim 10, where a hydrocarbon detection sensor is used on an output of the first stage to trigger stage switching of the process.

17. The process of claim 1, where the liquid fuel predominately contains molecules with 5 or more carbons.

18. The process of claim 1, where the liquid fuel is a logistic fuel.

19. The process of claim 1, where the liquid fuel comprises from 0.1% to 10% (by mass) sulfur.

20. The process of claim 1, where the water to carbon atom molar ratio used for the first stage is in a range from 2 to 5.

21. The process of claim 1, where the temperature of the first stage is in a range from 100 to 700° C.

22. The process of claim 1, where the pressure of the first stage is no more than 400 psi.

23. The process of claim 1, where oxygen or air is also fed with the water and liquid fuel to the first stage at an oxygen atom to carbon atom molar ratio of up to 0.5.

24. The process of claim 1, where the water to air ratio in the second stage is between 0 and 1.

25. The process of claim 1, where the temperature of the second stage is in a range from 100 to 700° C.

26. The process of claim 1, where the pressure of the second stage is no more than 400 psi.

27. The process of claim 1, where heat is recovered from the second stage output stream and transferred to an inlet of the first stage.

28. The process of claim 19, where the liquid fuel comprises from 1% to 7% (by mass) sulfur.

29. The process of claim 28, where the liquid fuel comprises from 2% to 6% (by mass) sulfur.

30. The process of claim 20, where the water to carbon atom molar ratio used for the first stage is in a range from 3 to 4.

31. The process of claim 21, where the temperature of the first stage is in a range from 450 to 650° C.

32. The process of claim 22, where the pressure of the first stage is in a range from 150 to 300 psi.

33. The process of claim 25, where the temperature of the second stage is in a range from 450 to 650° C.

34. The process of claim 26, where the pressure of the second stage is no more than 100 psi.

* * * * *